(12) United States Patent
Sun et al.

(10) Patent No.: US 8,249,203 B2
(45) Date of Patent: Aug. 21, 2012

(54) TRUNCATION OF NOISY TAPS IN CHANNEL ESTIMATION

(75) Inventors: Thomas Sun, San Diego, CA (US); Raghuraman Krishnamoorthi, San Diego, CA (US); Fuyun Ling, San Diego, CA (US); Krishna Kiran Mukkavilli, San Diego, CA (US); Tao Tian, San Diego, CA (US); Bojan Vrcelj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 582 days.

(21) Appl. No.: 12/235,553

(22) Filed: Sep. 22, 2008

(65) Prior Publication Data

US 2010/0074317 A1   Mar. 25, 2010

(51) Int. Cl.
*H04B 1/10* (2006.01)
(52) U.S. Cl. ........ 375/346; 375/229; 375/232; 375/260; 375/340; 375/343; 375/349; 375/350; 455/63.1; 455/67.13; 455/114.2; 455/296; 455/501; 370/310; 370/335; 370/342; 370/480; 329/349; 329/353; 341/173; 341/180; 327/551; 708/300

(58) Field of Classification Search ............... 375/229, 375/232, 260, 340, 343, 346, 349, 350; 455/63.1, 455/67.13, 114.2, 296, 501; 370/210, 335, 370/342, 480; 329/349, 353; 341/173, 180; 327/551; 708/300
See application file for complete search history.

(56) References Cited

U.S. PATENT DOCUMENTS

| | | |
|---|---|---|
| 2005/0157801 A1 | 7/2005 | Gore et al. |
| 2006/0233269 A1 | 10/2006 | Bhushan et al. |
| 2007/0110127 A1 | 5/2007 | Mergen et al. |

OTHER PUBLICATIONS

International Search Report, PCT/US2009/057290, International Searching Authority, European Patent Office, May 3, 2010.
Written Opinion, PCT/US2009/057290, International Searching Authority, European Patent Office, May 3, 2010.

*Primary Examiner* — Leon Flores
(74) *Attorney, Agent, or Firm* — Ryan N. Farr (57) ABSTRACT

Methods and systems are described for processing a signal in wireless communications. The signal may have synchronization information. A method of processing a signal having synchronization information may include receiving the signal, and determining a truncation region of the time domain estimated channel, the estimated channel having taps. The method further includes processing the channel taps within the truncation region.

39 Claims, 5 Drawing Sheets

TRUNCATION OF NOISY TAPS IN CHANNEL ESTIMATION

BACKGROUND

Field

The present disclosure relates generally to telecommunications, and more specifically, to channel estimation techniques in wireless communications.

In a typical telecommunications system, the data to be transmitted is encoded with a turbo encoder, which generates a sequence of bits, referred to as "coded bits". Several coded bits may be blocked together and mapped to a point on a signal constellation, thereby generating a sequence of complex "modulation symbols." This sequence may be applied to a modulator, which generates a continuous time signal, which is transmitted over a wireless channel.

At the receiver, the modulation symbols may not correspond to the location of a point in the original signal constellation due to noise and other disturbances in the channel. For example, when the receiver (usually mobile) moves, it may encounter degraded communication channels due to noise and multipath distortion; both noise and distortion varying with time. The multipath distortion is due to a signal being received by the mobile at different times when it bounces off buildings and terrain, and from Doppler shifts. Multipath channels can cause intersymbol interference that can be reduced, or removed, with an equalizer. In orthogonal frequency-division multiplexing (OFDM) systems, the multipath channel will not cause intersymbol interference as long as the delay spread of the channel is less than the cyclic prefix.

A demodulator, using information from the signals, may be used to make decisions as to reduce, or eliminate, the noise corrupting the received points in the signal constellation. To perform demodulation, the demodulator requires a channel estimate that attempts to model the sampled impulse response of the communication channel. Typically, in a single carrier communications such as a code division multiple access (CDMA) system, the spacing of the taps of the channel is Ts, where Ts is defined to be the inverse of the transmission symbol (baud) rate. Similarly, in an OFDM communication system, the tap spacing of the time domain channel estimate is equal to sample rate of the inverse fast Fourier transform (FFT) output in the OFDM transmitter. This choice of spacing is very useful because it allows the detector to view the entire communication system as a discrete symbol source followed by a finite impulse response (FIR) filter and an additive noise source.

The channel estimate contains errors due to the additive noise in the communication system. The channel estimation errors degrade the demodulator performance relative to that utilizing ideal channel estimates. One approach used by the demodulator to reduces the variance of the channel estimation error uses time filtering to average among channel estimations generated from several OFDM symbols by using, e.g., 3-tap non-causal time filtering, and assume the channel is time invariant, or linearly changing during the period. However, this approach is insufficient and the performance is a few dB away from the theoretical ideal channel estimation. Accordingly, there is a need in the art for an improved demodulation process whose performance is closer to that uses the theoretical ideal channel estimation.

SUMMARY

In one embodiment of the present disclosure, a method of processing a signal having synchronization information may comprise receiving the signal, determining a truncation region of a time domain estimated channel, the estimated channel having taps. The method may further comprise eliminating the estimated channel taps comprising of noise, only within the truncation region.

DETAILED DESCRIPTION

Techniques for signal demodulation are described herein.

In some embodiments of the present disclosure, signal demodulation may be achieved by truncating signal-free channel taps between channel clusters. A method of processing a signal having synchronization information may comprise receiving the signal, determining a truncation region of a time domain estimated channel, the estimated channel having taps, and processing the channel taps within the truncation region. In one embodiment, the estimated channel taps comprising noise may be eliminated, only within the truncation region. In one embodiment, the synchronization information of the signal may be First Arrival Path/Last Arrival Path (FAP/LAP) position information, which may represent the delay spread of the channel estimation. The determination of the truncation region may include using a feedback from a previous determination, using a delay of a spectrum shaping filter, using the value of FAP/LAP/delay of the spectrum shaping filter, using a performance heuristic, or using empirical data. The determination of the truncation region may take place in the time domain. The demodulation of the signal may take place in the frequency domain. The determination of the truncation region may use 3-tap non-causal time filtering.

In some embodiments of the present disclosure, the receiver may determine the truncation region of the time domain channel estimation, and force zero the time domain channel estimation paths in the truncation region. In these embodiments, a processing system may be configured to receive a signal having synchronization information, determine a truncation region of a time domain estimated channel, and eliminate the estimated channel taps comprising of noise only, within the truncation region. In the demodulator, the time synchronization information of the channel estimation may be FAP/LAP information.

In one embodiment, the truncation region may be defined as a union of noise regions between the signal clusters. Each signal cluster n may be defined as the channel taps between FAP_n and LAP_n, increased on each side by a number of taps in the amount of the delay of the spectrum shaping filter. In one embodiment, the processing system in the demodulator may be further configured to determine the truncation region using feedback from a previous determination, to determine the truncation region using a delay of a spectrum shaping filter, to determine the truncation region using FAP/LAP/delay of the spectrum shaping filter, to determine the truncation region using a performance heuristic, or to determine the truncation region using empirical data. When the processing system is determining the truncation region, the determining may take place in the time domain. The processing system may be further configured to utilize the time domain channel estimation paths only outside truncation region. In the demodulator, the processing system may be further configured to determine the truncation region using 3-tap non-causal time filtering.

In yet other embodiments of the present disclosure, the signal demodulation may be achieved with a processing system comprising means for receiving a signal having synchronization information, means for determining a truncation region of a time domain estimated channel, the estimated channel having taps, and means for eliminating the estimated channel taps comprising of noise only, within the truncation region. This may utilize the time domain channel estimation paths only outside truncation region. The synchronization information of the signal may be FAP/LAP information. The means for determining the truncation region may include means for using a feedback from a previous determination, means for using a delay of a spectrum shaping filter, means for using FAP/LAP/delay of the spectrum shaping filter, means for using a performance heuristic, or means for using empirical data. The means for determining the truncation region may take place in the time domain. The means for demodulating the signal may take place in the frequency domain. The means for determining the truncation region may include means for using 3-tap non-causal time filtering.

In some embodiments of the present disclosure, signal demodulation may be achieved with computer readable media encoded with a computer program for a demodulation processor to demodulate a signal having synchronization information, the instructions comprising routine to receive the signal, routine to determine a truncation region of the signal, and routine to demodulate the signal. The synchronization information of the signal may be FAP/LAP information. The routine to determine the truncation region may include the routine to use a feedback from a previous determination, the routine to use a delay of a spectrum shaping filter, the routine to use FAP/LAP/delay of the spectrum shaping filter, the routine to use a performance heuristic, or the routine to use empirical data. The routine to determine the truncation region may determine in the time domain. The routine to demodulate the signal may demodulate in the frequency domain. The routine to determine the truncation region may include the routine to use 3-tap non-causal time filtering.

In some embodiments of the present disclosure, signal demodulation may be achieved with a computer program product comprising computer-readable medium, the computer-readable medium comprising code for causing a computer to receive a signal having synchronization information, code for causing a computer to determine a truncation region of the time domain channel estimation and code for causing a computer to utilize the time domain channel estimation paths only outside truncation region In some aspects, the signal demodulation is achieved with an apparatus comprising a demodulator having a processor configured to receive a signal having a synchronization information, to determine a truncation region of the time domain channel estimation, and to utilize the time domain channel estimation paths only outside truncation region. In one embodiment, the synchronization information of the signal may be FAP/LAP information. In one example, with a simplified algorithm, only a single pair FAP/LAP may be used, and the complete channel delay spread may be considered as a single signal cluster. Again, this cluster may be augmented by a number of taps on each side determined by the delay of the spectrum shaping filter, and the truncation region in this case is defined as everything outside this augmented signal cluster [FAP−delay/2, to, LAP+delay/2].

The demodulator may be further configured to determine the truncation region using feedback from a previous determination, to determine the truncation region using a delay of a spectrum shaping filter, to determine the truncation region using FAP/LAP/delay of the spectrum shaping filter, to determine the truncation region using a performance heuristic, or to determine the truncation region using empirical data. The demodulator may be further configured to determine the truncation region, the determining taking place in the time domain. The demodulator may be further configured to utilize the time domain channel estimation paths only outside truncation region, the demodulation taking place in the frequency domain. The demodulator may be further configured to determine the truncation region of channel estimation using 3-tap non-causal time filtering.

Various aspects and embodiments of the invention are described in further detail below. The detailed description set forth below in connection with the appended drawings is intended as a description of various aspects of the present invention and is not intended to represent the only aspects in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
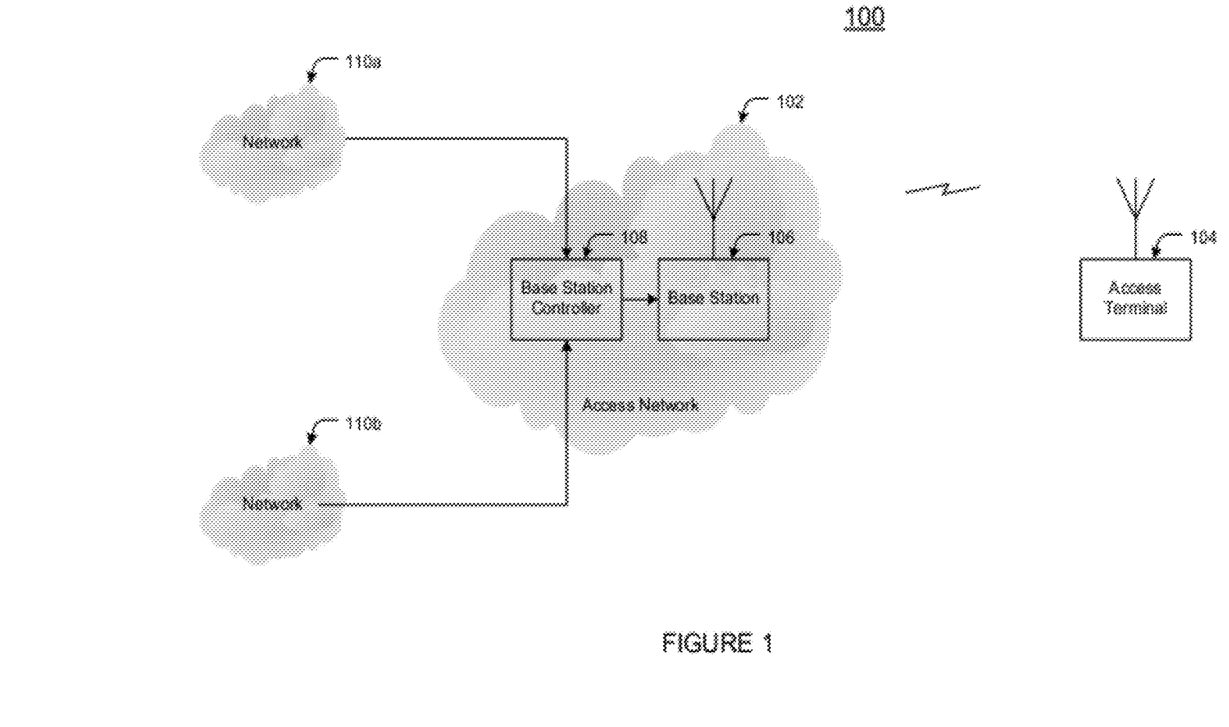
FIG. 1 is a conceptual block diagram illustrating an example of a telecommunications system.

FIG. 1 is a conceptual block diagram illustrating an example of a telecommunications system. The telecommunications system 100 may include an access network 102 which supports communications between any number of access terminals 104. The access network 102 may also be connected to additional networks 110*a* and 110*b* outside the access network 102, such as the Internet, a corporate intranet, a public switched telephone network (PSTN), a broadcast network, or any other network. The access terminal 104 may be any type of fixed or mobile device that can communicate with the access network 102 including a wireless handset or telephone, a cellular telephone, a data transceiver, a paging receiver, a position determination receiver, a modem, or the any other wireless terminal.

The access network 102 may be implemented with any number of base stations dispersed throughout a geographic region. The geographic region may be subdivided into smaller regions known as cells with a base station serving each cell. In high traffic applications, the cell may be further divided into sectors with a base station serving each sector. For simplicity, one base station 106 is shown. A base station controller 108 may be used to coordinate the activities of multiple base stations, as well as provide an interface to the networks outside the access network 102.

Figure 2:
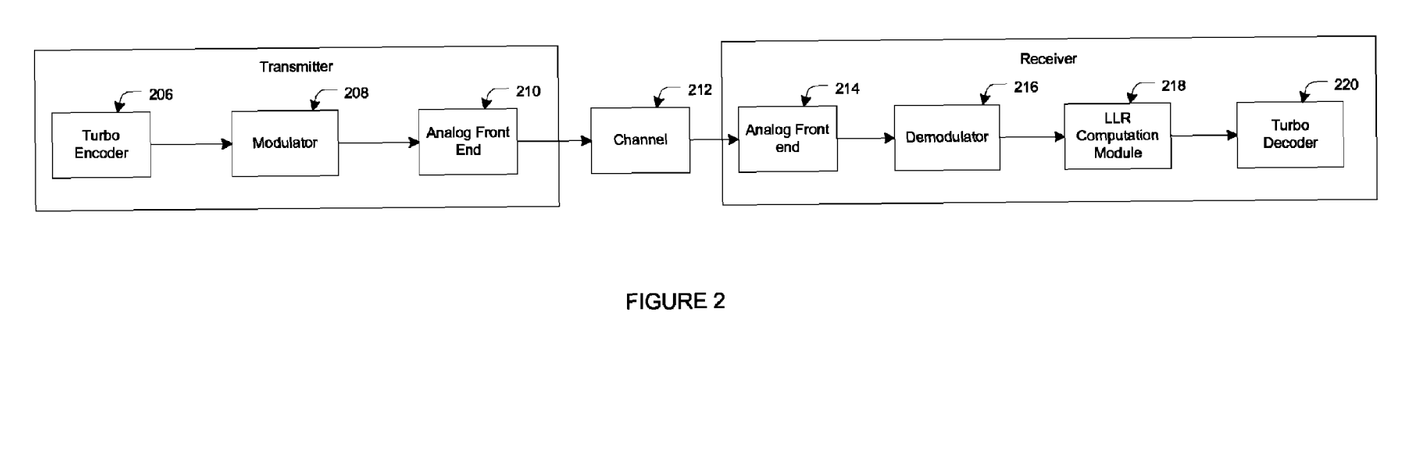
FIG. 2 is a conceptual block diagram illustrating an example of a transmitter in communication with a receiver.

FIG. 2 is a conceptual block diagram illustrating an example of a transmitter in communication with a receiver. The transmitter 202 and receiver 204 may be stand-alone entities, or integrated into a telecommunications system. In a telecommunications system, the transmitter 202 may be in the base station 106 and the receiver 204 may be in the access terminal 104. Alternatively, the transmitter 202 may be in the access terminal 104 and the receiver 204 may be in the base station 106.

At the transmitter 202, a turbo encoder 206 may be used to apply coding process to the data to facilitate forward error correction (FEC). The coding process results in a sequence of code symbols with redundancy that the receiver 204 may use to correct errors. The code symbols may be provided to a modulator 208 where they are blocked together and mapped to coordinates on a signal constellation. In an OFDM system, the coordinates of each point in the signal constellation represents a symbol modulated onto an subcarrier, which can be viewed as a modulation in frequency domain. In an OFDM transmitter, an inverse FFT (iFFT) block is employed to convert the symbols from frequency domain to time domain. The baseband quadrature components at the iFFT output are used by an analog front end 210 to modulate quadrature carrier signals before transmission over a wireless channel 212.

An analog front end 214 in the receiver 204 may be used to convert the quadrature carrier signals to their baseband components. A demodulator 216 may translate the baseband components back to their corresponding constellation points in the signal constellation. An OFDM receiver will include an FFT block convert the time domain signal samples to their frequency domain representation to recover the signal constellation points. Because of noise and other disturbances in the channel 212, the baseband components may not correspond to the exact locations in the original signal constellation.

The demodulator 216 detects which modulation symbols were most likely transmitted in the signal constellation. Noise reduction and signal recovery is challenging for a number of reason including those enumerated above (i.e. delay spread, multi-path inter-symbol interference). To assist in signal recovery, the signals are often encoded with additional information to assist in the error correction. One illustrative example of error correction coding is Reed Solomon coding. Other schemes include repetitions schemes, parity schemes, polarity schemes, cyclic redundancy checks, Hamming distance based checks, and so on. In addition to the error correction coding, the closer the received signal can be reduced to the original signal, the better the demodulation performance.

Methods that assist in retrieval of the code include reduction of the noise via time domain channel estimation truncation (elimination of estimated channel paths with only noise that is likely located outside of the true channel tap clusters) and via thresholding (elimination of estimated channel paths with only noise that does not exceed a specific threshold). Further, any additional channel information such as the original amplitude and phase of the channel will further assist in the demodulation process. In some embodiments of the present disclosure, channel information may be estimated using time filtering, which reduces the variance of error in the channel estimate and facilitates truncation of the noise taps with the aid of channel delay spread information from synchronization block to enhance the performance.

The log-likelihood ratio (LLR) generation and turbo decoding (inner code) and Reed Solomon decoding (outer code) modules that follow the demodulator are parts of the receiver. A LLR computation module 218 uses the most likely transmitted in the signal constellation detected by the demodulator 216 to generate the log-likelihood ratio (LLR) values of the coded bits that constitutes the modulation symbols represented by the constellation points. A turbo decoder 220 uses the sequence of coded bit LLRs in order to decode the data that was originally transmitted.

The telecommunications system may be implemented with any number of different technologies. Code Division Multiple Access (CDMA), which is well known in the art, is just one example. CDMA is a modulation and multiple access scheme based on spread-spectrum communications. In a CDMA telecommunications system, a large number of signals share the same frequency spectrum and, as a result, provides high user capacity. This is achieved by transmitting each signal with a different code that modulates a carrier, and thereby, spreads the spectrum of the signal waveform. The transmitted signals are separated in the receiver by a demodulator that uses a corresponding code to despread the signal. The undesired signals, whose code does not match, are not despread and contribute only to noise.

Orthogonal Frequency Division Multiplexing (OFDM) is another example of a technology that can be implemented by a telecommunications system. OFDM is a spread-spectrum technique that distributes data over a large number of carriers spaced apart at precise frequencies. The spacing provides the "orthogonality" that prevents a receiver from seeing frequencies other than those intended for the receiver. OFDM, which is also well known in the art, is commonly used for commercial and private broadcasts, but is not limited to such applications.

In one embodiment of the telecommunications system, a hybrid multi-access scheme may be employed using both CDMA and OFDM communications. This hybrid system has been gaining widespread acceptance in the area of broadcast services which are integrated into existing infrastructures originally designed to support point-to-point communications between a transmitter and receiver. In these systems, the transmitter may be used to puncture OFDM symbols into a CDMA waveform.

When the demodulator receives the signal, the received signal $Y_k$ on sub carrier k can be written as $$Y_k = H_k \cdot P_k + N_k \qquad (1)$$

where $H_k$ is the channel of sub-carrier k. $P_k$ is the known symbol transmitted on sub-carrier k. And, $N_k$ is a complex additive white Gaussian noise (AWGN) with zero mean and a variance of $\sigma^2$.

Channel estimation in OFDM is usually performed by transmitting known symbols. Since an OFDM channel can be viewed as a set of parallel flat channels, the received signal on each sub-carrier that is modulated by the known pilot symbol (pilot subcarrier) is divided by the transmitted pilot symbol to obtain the frequency domain channel value of the pilot sub-carrier. In one embodiment of the present disclosure, channel estimation (tracking) in OFDM systems may be based on the use of pilot sub-carriers in given positions of the frequency-time grid. In one embodiment, a forward link only (FLO) pilot structure may be used. In a case in which the number of channel taps is less than the number of pilots per OFDM symbol, e.g., 512 for the system under consideration, and the energy per symbol/noise spectral density ($E_s/N_0$) is high, the channel estimation may be accurate for the "No Time Filtering (NTF)" case. In the case where the number of channel taps is more than the number of pilots per OFDM symbol and with staggered pilot pattern, the channel estimation can be more accurate for the "Time Filtering (TF) and low Doppler" case.

The signals then travel across a medium (such as air) and the receiver 204 typically observes distortions in the signal due to multi-path resulting in the spreading out or "smearing" of the received signal. This type of distortion, called a multi-path inter-symbol interference, occurs when identical signals arrive via different paths with different magnitudes and delays and have different time delays. The effect of multi-path for a digital communication system in which multiple reflections of the same signal arrive at the receiver 204 at different times, creates a noticeable degradation in signal quality without correction. To correct for these signal degradations, one of a number of approaches are available, including increasing the signal strength, decreasing the transmission rate, or directly correct for the degradation in the received signal. In OFDM systems, the multipath channel will not cause inter-symbol interference as long as the delay spread is less than cyclic prefix.

To illustrate the degree of signal degradation commonly found in practice, in a Typical Urban (TU) channel, the delay spread is approximately 5 μs. If the effects of pulse shaping filter is included, the delay spread of the TU channel increases to approximately 10.8 μs, which is equivalent to about 60 non-zero taps (when none of the channel taps is in deep fade) in a system with an FFT sampling rate of approximately 5.55 MHz. In a Pedestrian B (PedB) repeated channel, a delay spread of approximately 7.4 μs is observed. If the effects of pulse shaping filter is included, the delay spread of the PedB channel increases to approximately 17.4 μs, which is equivalent to about 96 non-zero taps (when none of the channel taps is in deep fade).

Because information on the incoming signal is limited and non-perfect, the demodulator decides how to best decode the signal. To improve the demodulation performance, in some aspects, the demodulator can employ intelligent truncation of time domain estimated channel taps to enhance the demodulator's performance and achieve a better required signal to noise ratio (i.e. energy per symbol/noise spectral density ($E_s/N_0$), in dB).

In intelligent truncation, one or more truncation domains are determined which specify to what extend a time domain estimated channel is truncated. For example, one example of intelligent truncation is 0 to FAP−20 and LAP+20 to maximum number of channel paths (0 to First Arrival Path minus 20, and Last Arrival Path plus 20 to maximum). This truncation distinguished estimated channel paths within this range and outside this range. Estimated channel paths outside the truncation range are treated as fake channel tapes due to noise and processed appropriately (e.g. discarded, reduced, and so on). Estimated channel paths inside this range is treated as actual channel path and processed as appropriate (e.g. used as channel tap after thresholding, and so on). Once the time domain estimated channel has been intelligently truncated, the output is for LLR generation.

Figure 4A:
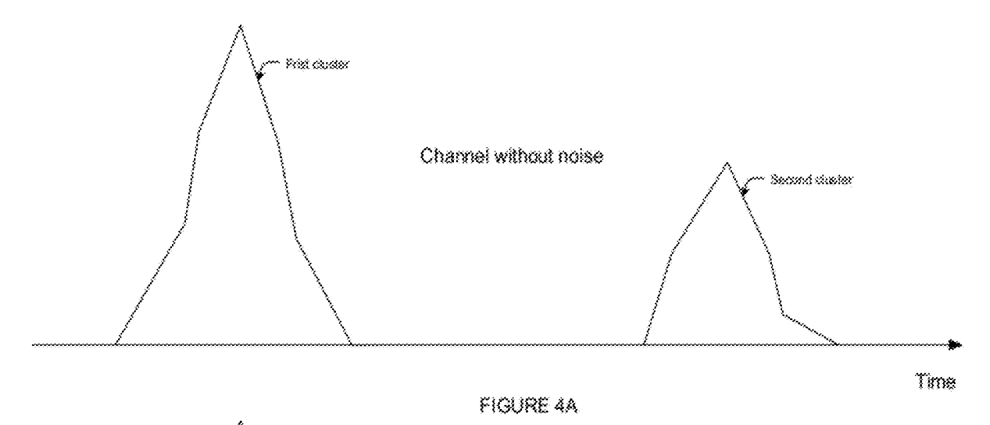
FIG. 4A illustrates a time domain channel profile with two channel tap clusters and no additive noise.
Figure 4B:
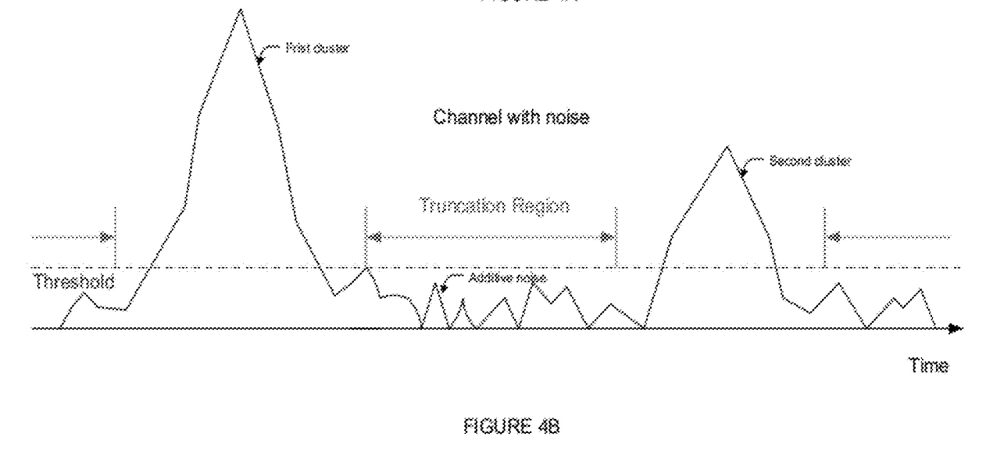
FIG. 4B illustrates the same time domain channel profile of FIG. 4A with additive noise, the channel profile having a truncation region defined inbetween the two clusters.

FIG. 4A illustrates one example of such intelligent truncation. In particular, FIG. 4A illustrates a time domain channel profile, in a case in which there is no additive noise. In FIG. 4A, the x-axis indicates the time, while the y-axis indicates the channel energy amplitude. Because there is no additive noise, there is nothing between the first cluster and the second cluster. The same channel profile is shown in FIG. 4B, but with additive noise. Because of the additive noise, channel estimation is degraded. A threshold for the channel energy amplitude is indicated in FIG. 4B with a dashed line. As seen in FIG. 4B, a truncation region can be defined where the channel energy amplitude is below the threshold. Intelligent truncation is performed by truncating any fake channel taps appearing within this region. FIG. 4B illustrates a truncation region before the first channel cluster, another truncation region between the first and the second cluster, and a third truncation region after the second cluster.

Figure 5:
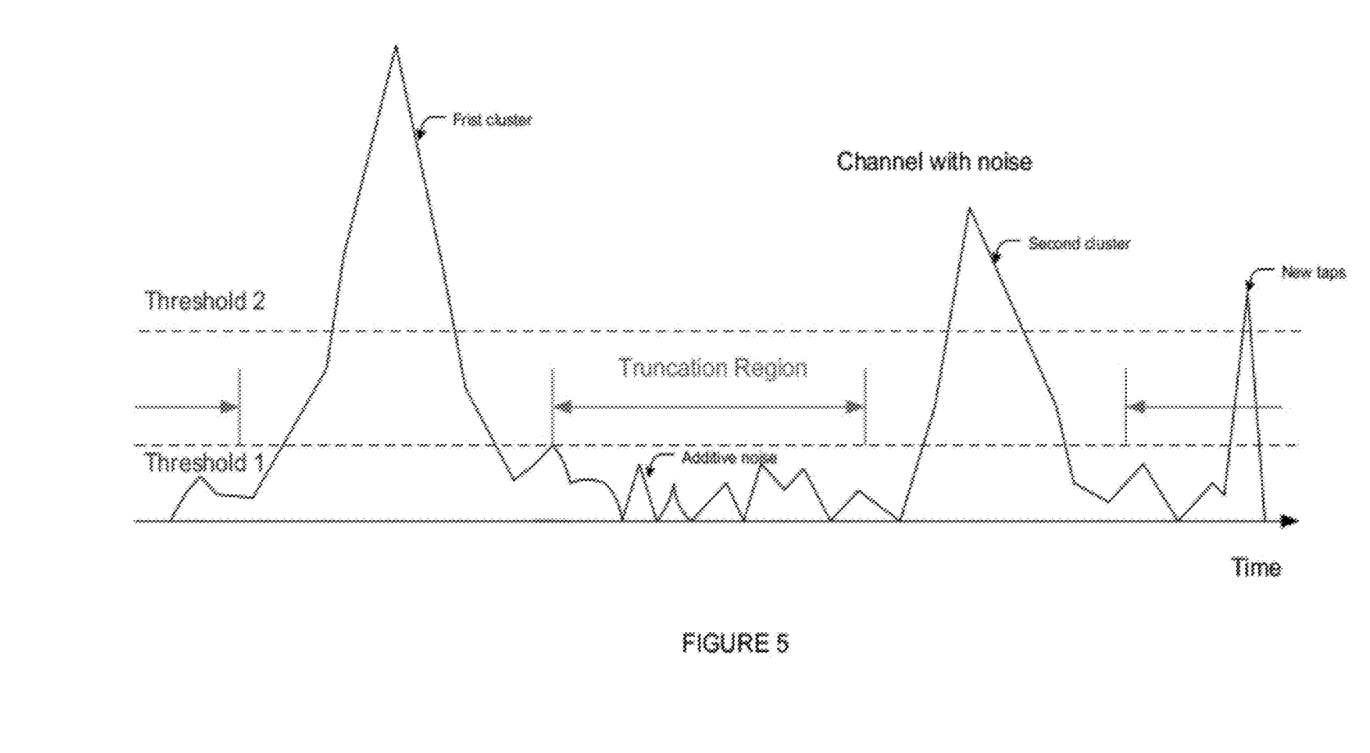
FIG. 5 illustrates a time domain channel profile in which two thresholds are used, the larger threshold defining an amplitude value indicating a third channel tap cluster.

FIG. 5 illustrates another example of truncation, in which more than one threshold level is defined: threshold 1 and threshold 2. In FIG. 5, a new channel cluster (shown as "new taps" in FIG. 5) is shown as growing after the second cluster. As seen in FIG. 5, the third cluster starts growing at a location within the third truncation region. Therefore, if the third truncation region were defined solely with respect to the first threshold (shown as "threshold 1" in FIG. 5), the new channel cluster would erroneously be truncated. Accordingly, in the truncation scheme of FIG. 5, a second threshold (shown as "threshold 2" in FIG. 5) is used. In the embodiment illustrated in FIG. 5, threshold 2 is substantially higher than threshold 1. If no signal (channel energy) appears within a truncation region that is above threshold 2, the truncation region is truncated in its entirety, in the embodiment illustrated in FIG. 5. If a channel energy amplitude appears within the truncation region that is above threshold 2, such channel energy amplitude is considered as a newly appearing channel tap, and hence is not truncated.

In deciding how to truncate the time domain estimated channel, some embodiments may employ logic based on information in these channels. For example, there are some paths before FAP and after LAP that have significant energy due to the delay of pulse shaping filter. Based to the delay of pulse shaping filter, a delta around or about 20 yields is used. In these aspects, the signal stream outside 20 is treated as noise. Choosing FAP−20 to LAP+20 takes into consideration the equivalent filtering of inserting 0 at a guard sub-carrier during the channel estimation.

Some aspects of intelligent truncation include a FAP/LAP aided truncation algorithm. FAP stands for the First Arrival Path, and LAP stands for the Last Arrival Path of the signal, both relative to the available time-domain channel estimate. Instead of using the FAP/LAP information from a single channel estimate, sometimes it is useful to also consider the trend of FAP/LAP behavior over a time duration. An example when this may be useful is in scenarios with signal fading. The instantaneous channel estimate may be subject to a deep fade, and FAP and LAP values may be estimated wrongly due to an instantaneous fade. However, FAP/LAP information may be more robust to fades if information on the average trend of FAP/LAP behavior is also maintained. This is achieved through a notion of the channel estimates with long time constants, also known as "average" channel estimates. These estimates are obtained by averaging several instantaneous channel estimates from a recent past. FAP/LAP determination algorithm may utilize the result from a channel estimator with short time constant and generates instantaneous FAP/LAP estimates. The other one many may utilize the result from a channel estimator with long time constant and generates "average" FAP/LAP estimates.

In this FAP/LAP aided truncation algorithm, the channel taps start at a chip position of: 20 chips less than the smaller of the instantaneous FAP and the "average" FAP. The channel taps end at the chip position of 20 chips more than the larger of the instantaneous LAP and the "average" LAP. In other aspects, intelligent truncation with FAP/LAP information from synchronization block can enhance the performance very close to theoretically expected value for single cluster channel case. In some aspects, these same approaches can be used to enhance performance of multiple cluster channel cases when used with good estimation of the boundaries of multiple clusters.

Even in the truncation region, there is still a chance that some actual tap suddenly or gradually appear. So, a thresholding level different from non-truncation region can be applied in the truncation region, and/or multiple levels of thresholding can be applied in the truncation region and non-truncation region to enhance the receiver performance.

In other aspects, other algorithms may include choosing the truncation range based on an update scheme based on a feedback loop. In some aspects, the truncation range is based on a delay of the filter, filter_delay (i.e. truncation ranges are before (FAP−filter_delay) and after (LAP+filter_delay). In the above example, filter_delay=20. Other truncation ranges that use the filter_delay also within the scope of this disclosure can include a range that is proportional to the range of before (FAP−filter_delay) and after (LAP+filter_delay), a range that is before (FAP−filter_delay−constant) and after (LAP+filter_delay+constant), a range that is proportional to the range of before (FAP−coefficient*filter_delay) and after (LAP+coefficient*filter_delay), and so on. In yet other aspects, truncation logic can base the truncation on performance heuristics, on empirical data, and so on. In the above example, the filter_delay=20 is based on empirical data.

In other aspects, other algorithms may include choosing the truncation regions based on an update scheme whereupon more than two such regions are determined. For example, it may be determined that the signal taps form two or more disjoint clusters. Thus, the taps in the channel estimate between these signal clusters most likely contain noise rather than useful signal information. Thus an additional domain may be placed between any two signal clusters and the taps inside this domain will be processed appropriately (e.g. discarded, reduced, and so on).

For example, the overall truncation region may be chosen as a union of the truncation region described above, and truncation regions between each of the determined signal clusters. In this example, the first truncation region comprises the channel taps before ($FAP_{min}$−coefficient*filter_delay) and after ($LAP_{max}$+coefficient*filter_delay), where $FAP_{min}$ and $LAP_{max}$ denote FAP of the first signal cluster and LAP of the last signal cluster, respectively. By denoting the LAP of the first and the FAP of the second signal cluster by $LAP_1$ and $FAP_2$, next truncation region may be defined between ($LAP_1$+ coefficient*filter_delay) and ($FAP_2$− coefficient*filter_delay), and so forth. Moreover, the channel estimation taps in each of the described truncation regions may be processed separately, as appropriate, e.g. discarded, reduced, thresholded, and so on.

In some aspects, the carrier frequency of the signals is 700 MHz and the bandwidth used is the 6 MHz band. The channel is time invariant or linearly changing during the transmission of three OFDM symbols. Other environmental parameters including turbo encoding rate (e.g. ½, ⅔, and so on), modulation schemes (e.g. quadrature phase-shift keying (QPSK), quadrature amplitude modulation (QAM), and so on), TU channel models (e.g. 300 km/ph, 75 km/ph, and so on), time filtering versus no time filtering, coding techniques (e.g. Reed Solomon, Hamming, and so on), and various other methods can be selected and employed for enhancing demodulation performance.

Figure 3:
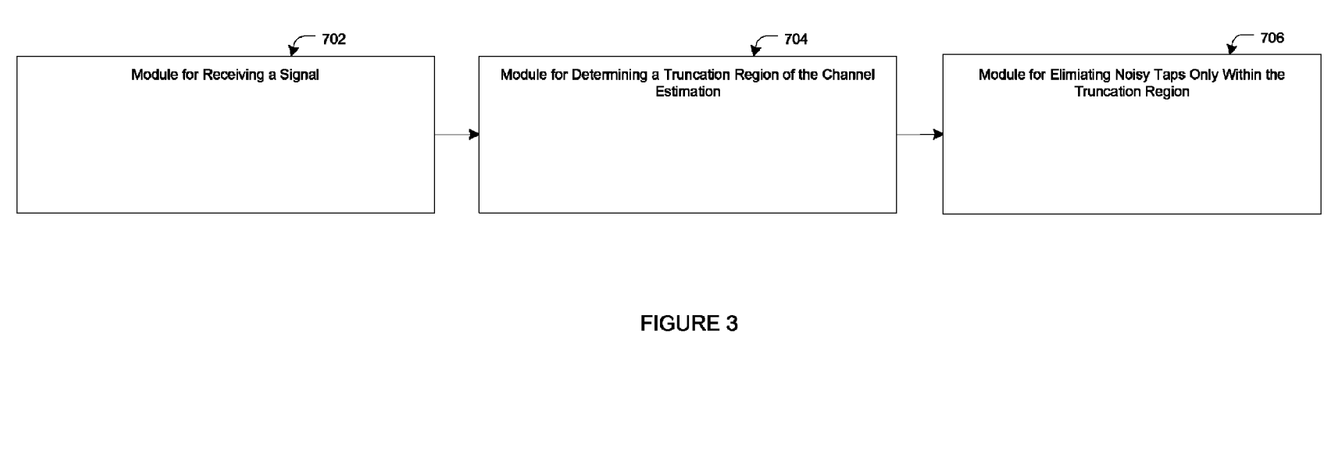
FIG. 3 is a conceptual block diagram illustrating an example of truncating channel estimation paths.

FIG. 3 is a conceptual block diagram illustrating an example of a module for truncating channel estimation paths. The receiver module 702 receives the signal for demodulation. In a telecommunications system, the receiver module 702 may be in or implemented as an access terminal. Alternatively, the receiver module 702 may be in a base station.

The receiver module 702 receives turbo encoded data. The coding process results in a sequence of coded bits with redundancy that the receiver module 702 may use to correct errors. The coded bits may have been provided to a modulator where they are blocked together and mapped to coordinates on a signal constellation. The coordinates of each point in the signal constellation represents the baseband quadrature components that are used by an analog front end of the receiver module 702 to modulate quadrature carrier signals before transmission over a wireless channel. The analog front end in the receiver module 702 may be used to convert the received quadrature carrier signals to their baseband components. The receiver module passes the signal to a determination module 704 to determine a truncation region of the time domain estimated channel. In some aspects, this determination module 704 may be in a demodulator.

The determination module determines which region or regions of the time domain estimated channel is likely mainly caused by noise and which region or regions is likely actual channel taps. In some aspects, a 3-tap non-casual time filtering is used to reduce the noise. The time filtering involves linearly averaging the channel estimation of current OFDM symbol with one OFDM symbol before the current symbol, as well as one or more OFDM symbol after the current symbol. If the channel of the three consecutive OFDM symbols changes linearly in time, the time filtering can reduce the noise.

The telecommunications system may be implemented with any number of different technologies. Code Division Multiple Access (CDMA), which is well known in the art, is just one example. CDMA is a modulation and multiple access scheme based on spread-spectrum communications. In a CDMA telecommunications system, a large number of signals share the same frequency spectrum and, as a result, provides high user capacity. This is achieved by transmitting each signal with a different code that modulates a carrier, and thereby, spreads the spectrum of the signal waveform. The transmitted signals are separated in the receiver by a demodulator that uses a corresponding code to despread the signal. The undesired signals, whose code does not match, are not despread and contribute only to noise.

Orthogonal Frequency Division Multiplexing (OFDM) is another example of a technology that can be implemented by a telecommunications system. OFDM is a spread-spectrum technique that distributes data over a large number of carriers spaced apart at precise frequencies. The spacing provides the "orthogonality" that prevents a receiver module from seeing frequencies other than those intended for the receiver module. OFDM, which is also well known in the art, is commonly used for commercial and private broadcasts, but is not limited to such applications.

In at least one aspect of the telecommunications system, a hybrid multi-access scheme may be employed using both CDMA and OFDM communications. This hybrid system has been gaining widespread acceptance in the area of broadcast services which are integrated into existing infrastructures originally designed to support point-to-point communications between a transmitter and receiver. In these systems, the transmitter (or transmitter module) may be used to puncture OFDM symbols into a CDMA waveform.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in random access memory (RAM), flash memory, read-only memory (ROM), erasable programmable read-only memory (EPROM), Electrically Erasable Programmable Read-Only Memory (EEPROM), registers, hard disk, a removable disk, a compact-disk read-only memory (CD-ROM), or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of processing a signal, comprising:
   receiving, by a wireless terminal, the signal;
   determining, by the wireless terminal, a truncation region bounded between a plurality of signal clusters within a delay spread of a time domain estimated channel, wherein each of the plurality of signal clusters is defined as channel taps between a first arrival path (FAP) and a last arrival path (LAP) of the signal cluster that is increased on each side by a filter delay; and
   reducing, by the wireless terminal, a number of the channel taps within the truncation region.

2. The method of claim 1, wherein the signal has synchronization information, and wherein the synchronization information is periodically updatable.

3. The method of claim 2, wherein the synchronization information of the signal comprises FAP/LAP information.

4. The method of claim 3, wherein the filter delay comprises a number of taps according to a delay of a spectrum shaping filter.

5. The method of claim 1, wherein the determination of the truncation region includes using one of:
   a feedback from a previous determination;
   a delay of a spectrum shaping filter;
   a performance heuristic;
   empirical data; and
   3-tap non-causal time filtering.

6. The method of claim 5, wherein the delay of the spectrum shaping filter comprises a FAP/LAP/delay of the spectrum shaping filter.

7. The method of claim 1, wherein reducing the number of channel taps comprises eliminating estimated channel taps having noise, with respect to a defined threshold.

8. The method of claim 1, wherein reducing the number of channel taps within the truncation region comprises eliminating estimated channel taps that include noise within the truncation region.

9. A demodulator, comprising:
   a processing system configured to:
   receive a signal,
   determine a truncation region bounded between a plurality of signal clusters within a delay spread of a time domain estimated channel, wherein each of the plurality of signal clusters is defined as channel taps between a first arrival path (FAP) and a last arrival path (LAP) of the signal cluster that is increased on each side by a filter delay; and
   reduce a number of the channel taps within the truncation region.

10. The demodulator of claim 9, wherein the signal has synchronization information, and wherein the synchronization information is periodically updatable.

11. The demodulator of claim 10, wherein the synchronization information of the signal is FAP/LAP information.

12. The demodulator of claim 9, wherein the processing system is further configured to determine the truncation region using one of:
    feedback from a previous determination;
    a delay of a spectrum shaping filter;
    a performance heuristic;
    empirical data; and
    3-tap non-causal time filtering.

13. The demodulator of claim 12, wherein the delay of the spectrum shaping filter comprises a FAP/LAP/delay of the spectrum shaping filter.

14. The demodulator of claim 9, wherein the processing system is further configured to determine the truncation region, the determining taking place in a time domain.

15. The demodulator of claim 9, wherein the processing system is further configured to eliminate estimated channel taps of noise only within the truncation region, the truncation taking place in the time domain.

16. A processing system, comprising:
    means for receiving a signal;
    means for determining a truncation region bounded between a plurality of signal clusters within a delay spread of a time domain estimated channel, wherein each of the plurality of signal clusters is defined as channel taps between a first arrival path (FAP) and a last arrival path (LAP) of the signal cluster that is increased on each side by a filter delay; and
    means for reducing a number of the channel taps within the truncation region.

17. The processing system of claim 16, wherein the signal has synchronization information, and wherein the synchronization information is periodically updatable.

18. The processing system of claim 17, wherein the synchronization information of the signal is FAP/LAP information.

19. The processing system of claim 16, wherein the means for determining the truncation region comprises one of:
    means for using a feedback from a previous determination;
    means for using a delay of a spectrum shaping filter;
    means for using empirical data;
    means for using a performance heuristic; and
    means for using 3-tap non-causal time filtering.

20. The processing system of claim 19, wherein the means for using a delay of a spectrum shaping filter comprises means for using a FAP/LAP/delay of the spectrum shaping filter.

21. The processing system of claim 16, wherein the means for determining the truncation region comprises means for determining the truncation region in a time domain.

22. The processing system of claim 16, wherein
the means for reducing a number of the channel taps comprises means for truncating the time domain estimated channel in a time domain.

23. A non-transitory computer readable media encoded with a computer program for a demodulation processor to demodulate a signal, the instructions comprising:
routine to receive the signal;
routine to determine a truncation region bounded between a plurality of signal clusters within a delay spread of a time domain estimated channel, wherein each of the plurality of signal clusters is defined as channel taps between a first arrival path (FAP) and a last arrival path (LAP) of the signal cluster that is increased on each side by a filter delay; and
routine to reduce a number of the channel taps within the truncation region.

24. The non-transitory computer readable media of claim 23, wherein the signal has synchronization information, and wherein the synchronization information is periodically updatable.

25. The non-transitory computer readable media of claim 24, wherein the synchronization information of the signal is FAP/LAP information.

26. The non-transitory computer readable media of claim 23, wherein the routine to determine the truncation region includes one of:
a routine to use a feedback from a previous determination;
a routine to use a delay of a spectrum shaping filter;
a routine to use a performance heuristic;
a routine to use empirical data; and
a routine to use 3-tap non-causal time filtering.

27. The non-transitory computer readable media of claim 26, wherein the routine to use a delay of a spectrum shaping filter includes a routine to use FAP/LAP/delay of the spectrum shaping filter.

28. The non-transitory computer readable media of claim 23, wherein the routine to determine the truncation region is performed in a time domain.

29. The non-transitory computer readable media of claim 28 wherein the routine to process the channel taps comprises routine to eliminate estimated channel taps that include noise in the time domain.

30. A computer program product, comprising:
a non-transitory computer-readable medium comprising:
code for causing a computer to receive a signal;
code for causing a computer to determine a truncation region bounded between a plurality of signal clusters within a delay spread of a time domain estimated channel, wherein each of the plurality of signal clusters is defined as channel taps between a first arrival path (FAP) and a last arrival path (LAP) of the signal cluster that is increased on each side by a filter delay; and
code for causing a computer to reduce a number of the channel taps within the truncation region.

31. The computer program product of claim 30, wherein the signal has synchronization information, and wherein the synchronization information is periodically updatable.

32. An apparatus comprising:
a demodulator having a processor configured to:
receive a signal,
determine a truncation region bounded between a plurality of signal clusters within a delay spread of a time domain estimated channel, wherein each of the plurality of signal clusters is defined as channel taps between a first arrival path (FAP) and a last arrival path (LAP) of the signal cluster that is increased on each side by a filter delay, and
reduce a number of the channel taps within the truncation region.

33. The apparatus of claim 32, wherein the signal has synchronization information, and wherein the synchronization information is periodically updatable.

34. The apparatus of claim 33, wherein the synchronization information of the signal is FAP/LAP information.

35. The apparatus of claim 32, the processor further configured to generate LLR, to turbo decode, and to Reed Solomon decode.

36. The apparatus of claim 32, wherein the demodulator is further configured to determine the truncation region using one of:
feedback from a previous determination;
a delay of a spectrum shaping filter;
a performance heuristic;
empirical data; and
3-tap non-causal time filtering.

37. The apparatus of claim 36, wherein the delay of the spectrum shaping filter comprises a FAP/LAP/delay of the spectrum shaping filter.

38. The apparatus of claim 32, wherein the demodulator is further configured to determine the truncation region during a time domain.

39. The apparatus of claim 32, wherein the demodulator is further configured to eliminate the estimated channel taps of noise only within the truncation region, the elimination taking place in the time domain.

* * * * *